United States Patent [19]

Smith

[11] Patent Number: 5,444,864
[45] Date of Patent: Aug. 22, 1995

[54] METHOD AND APPARATUS FOR CANCELLING IN-BAND ENERGY LEAKAGE FROM TRANSMITTER TO RECEIVER

[75] Inventor: Winthrop W. Smith, Greenville, Tex.

[73] Assignee: E-Systems, Inc., Dallas, Tex.

[21] Appl. No.: 995,055

[22] Filed: Dec. 22, 1992

[51] Int. Cl.⁶ .............................................. H04B 1/56
[52] U.S. Cl. ...................................... 455/84; 455/24; 455/78; 455/82
[58] Field of Search ....................... 455/76, 79, 80, 82, 455/83, 295, 304, 307, 84, 24, 126

[56] References Cited

U.S. PATENT DOCUMENTS

| | | |
|---|---|---|
| 3,113,269 | 12/1963 | Essam . |
| 3,132,339 | 5/1964 | Boughnou . |
| 3,696,429 | 10/1972 | Tressa . |
| 3,699,444 | 10/1972 | Ghose et al. ............... 455/304 |
| 3,810,182 | 5/1974 | White et al. . |
| 4,423,505 | 12/1983 | Greig . |
| 4,475,243 | 10/1984 | Batlivala et al. ............. 455/78 |
| 4,633,511 | 12/1986 | Koga et al. ................. 455/76 |
| 4,660,042 | 4/1987 | Ekstrom ..................... 455/79 |
| 4,952,193 | 8/1990 | Talwar ....................... 455/295 |
| 4,991,165 | 2/1991 | Cronyn ....................... 455/79 |

Primary Examiner—Edward F. Urban
Assistant Examiner—Mary M. Lin
Attorney, Agent, or Firm—Harold E. Meier

[57] ABSTRACT

A method and apparatus system for cancelling a leak-through signal component generated by an interfering transmitter from a received/leak-through signal comprising a multiplier for multiplying the received/leak-through signal by a reference signal provided from the interfering transmitter. The system further includes an integrator for integrating the output of the multiplier to generate an estimate of the gain and phase of the leak-through signal component. A gain and phase adjustor, responsive to the generated gain and phase estimates, is also included for adjusting the gain and phase of the reference signal to generate a cancellation signal that is a substantially gain and phase matched estimate of the leak-through signal. The generated cancellation signal is then subtracted from the received/leak-through signal to substantially cancel the leak-through signal component.

14 Claims, 5 Drawing Sheets

METHOD AND APPARATUS FOR CANCELLING IN-BAND ENERGY LEAKAGE FROM TRANSMITTER TO RECEIVER

TECHNICAL FIELD

This invention relates to leak-through signal cancelling method and apparatus and, in particular, to a method and apparatus for generating a cancellation signal that is a gain and phase matched estimate of a leak-through signal generated by an interfering transmitter.

BACKGROUND OF THE INVENTION

It is well known for the transmitter and receiver of a radio frequency transmission system to be configured to either make use of the same antenna or have separate transmit and receive antennas that are placed in close proximity to each other. The signal interference problems associated with such transmission system configurations are also well known in the art. One serious problem occurs when a portion of the signal generated by the transmitter "leaks-through", to the receiver and mixes with the received signal. When the leak-through signal is in the passband of the receiver, the likelihood of degradation in receiver performance substantially increases. Accordingly, there is need for transceiver and antenna isolation systems (e.g., directive antennas, circulators, balanced networks and hybrids, filters) and interference cancellation systems (e.g., leak-through signal cancelers).

SUMMARY OF THE INVENTION

The present invention estimates the leak-through signal induced by an interfering transmitter and mixed with a desired received signal to generate a leak-through cancellation signal. A received/leak-through signal, comprised of the desired received signal and the undesired leak-through signal, and a reference signal, obtained from the interfering transmitter, are processed using matched filter computation means to estimate the gain and phase of the leak-through signal. The gain and phase of the reference signal are then adjusted in accordance with the gain and phase estimates to generate a cancellation signal that is a substantially gain and phase matched estimate of the leak-through signal. By subtracting the cancellation signal from the received/leak-through signal, the leak-through signal is substantially cancelled and the desired received signal is recovered for further processing.

BRIEF DESCRIPTION OF THE DRAWINGS

A more complete understanding of the signal canceler of the present invention may be had by reference to the following Detailed Description when taken in conjunction with the accompanying Drawings wherein.

DETAILED DESCRIPTION OF THE DRAWINGS

Figure 1:
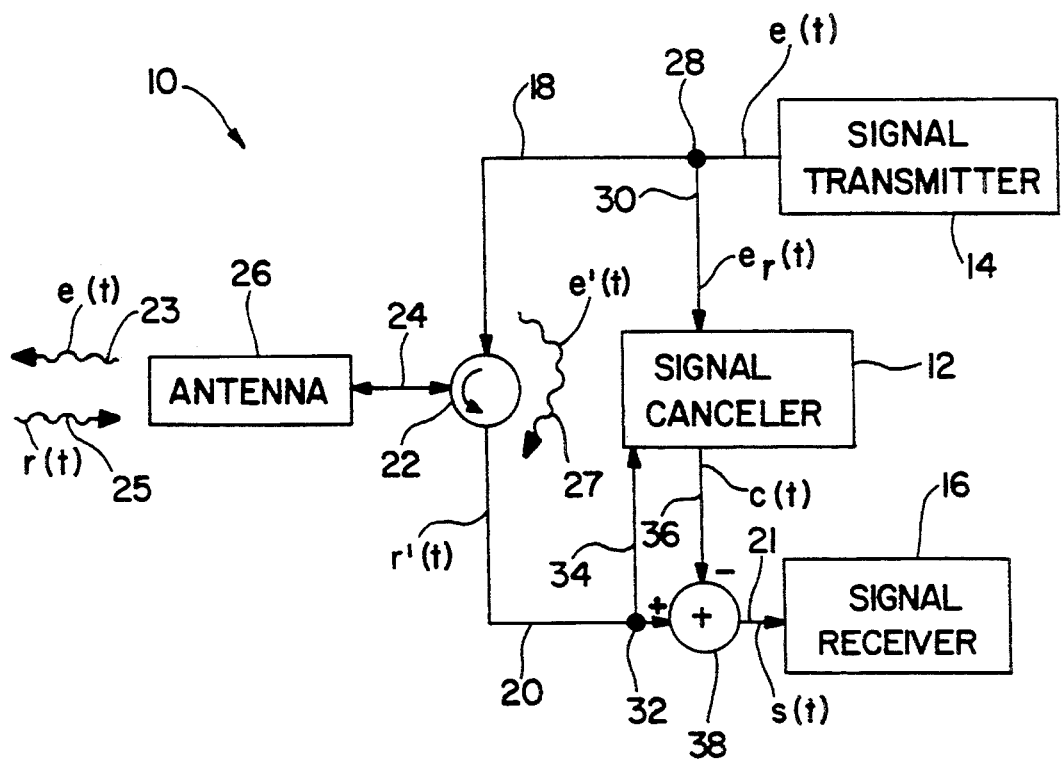
FIG. 1 is a simplified block diagram of a radio transceiver including a leak-through signal canceler of the present invention.

Referring now to FIG. 1, there is shown a simplified block diagram of a radio transceiver 10 including the leak-through signal canceler 12 of the present invention. The radio transceiver 10 further includes a signal transmitter 14 generating a transmit signal $e(t)$. The signal transmitter 14 is coupled by way of transmit line 18 to a diplexer 22, with the diplexer connected by way of bi-directional line 24 to an antenna 26 that broadcasts the transmit signal $e(t)$ as shown at 23. The radio transceiver 10 further includes a signal receiver 16 for processing a received signal $r(t)$ as shown at 25 received by the antenna 26. The signal receiver 16 is coupled by way of receive lines 20 and 21 to the diplexer 22, with the diplexer connected by way of bi-directional line 24 to the antenna 26.

The diplexer 22 is designed to isolate the received signal $r(t)$ from the transmitted signal $e(t)$ by directing substantially all of the transmitted signal to the bi-directional line 24. However, as shown at 27, some part (or by-product) $e'(t)$ of the transmitted signal $e(t)$ will inevitably "leak-through" the diplexer 22 to the receive line 20 and mix with the received signal $r(t)$ resulting in the presence of a mixed received/leak-through signal $r'(t)$ on receive line 20 (wherein $r'(t) = r(t) + e'(t)$). If the leak-through signal component $e'(t)$ of the received/leak-through signal $r'(t)$ is in the passband of the signal receiver 16, then incorrect signal processing of the received signal $r(t)$ by the signal receiver may result.

The leak-through signal canceler 12 of the present invention is coupled to the transmit line 18 at node 28 by way of line 30 to sample the transmitted signal $e(t)$ and obtain a reference signal $e_r(t)$ for further processing. The leak-through signal canceler 12 is also coupled to the receive line 20 at node 32 by way of line 34 to receive the received/leak-through signal $r'(t)$. By processing the reference signal $e_r(t)$ and the received/leak-through signal $r'(t)$ in a manner to be described, the leak-through signal canceler 12 will generate a cancellation signal $c(t)$ for output on line 36.

A summer 38 is provided to subtract the cancellation signal $c(t)$ from the received/leak-through signal $r'(t)$ and generate an output signal $s(t)$ on line 21. If the cancellation signal $c(t)$ is a substantially gain and phase matched estimate of the leak-through signal component $e'(t)$ of the received/leak-through signal $r'(t)$, then the leak-through signal component $e'(t)$ will be substantially cancelled from the received/leak-through signal $r'(t)$. Thus, the output signal $s(t)$ of the summer 38 processed by the receiver 16 will be substantially equal to the received signal $r(t)$ received by the antenna 26.

Figure 2:
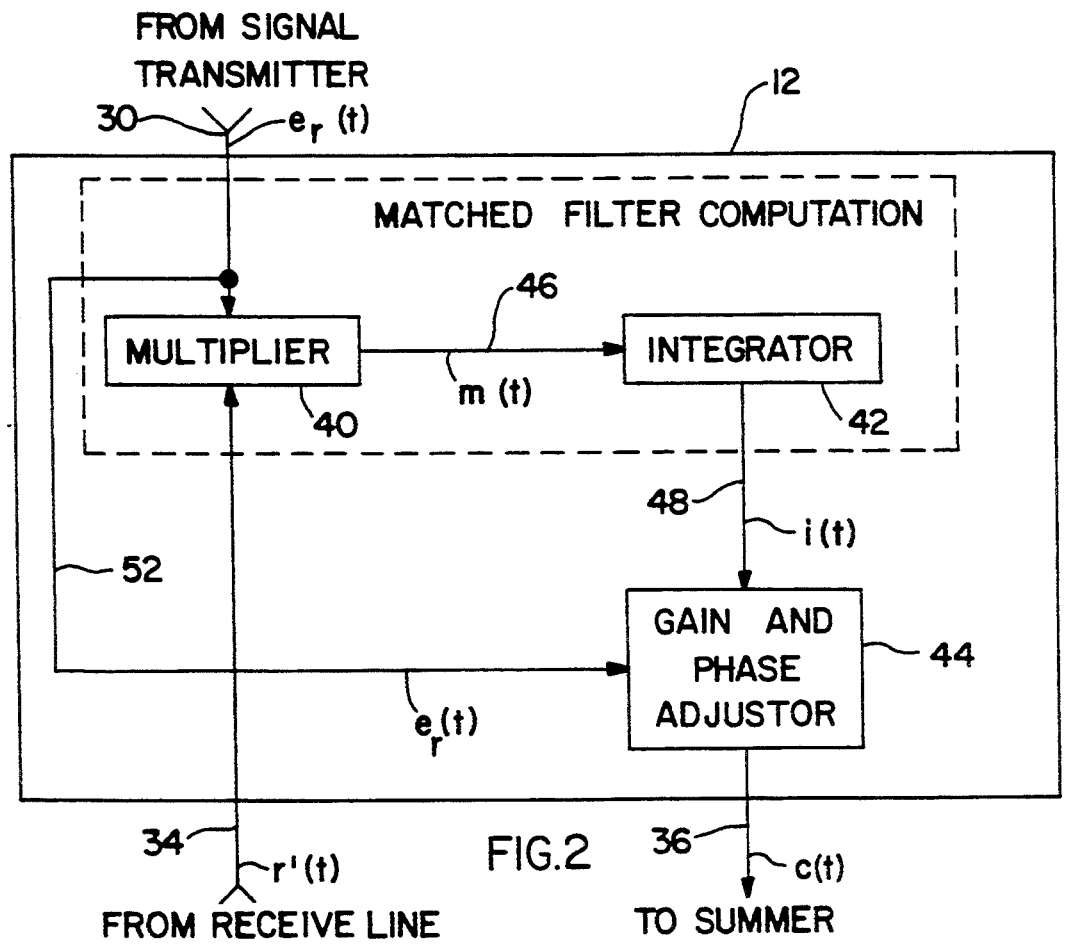
FIG. 2 is a block diagram of the leak-through signal canceler of the present invention.

Referring now to FIG. 2, there is shown a block diagram of the leak-through signal canceler 12 of the present invention comprising a multiplier 40, an integrator 42 and a gain and phase adjustor 44. The multiplier 40 processes the reference signal $e_r(t)$ and the received/leak-through signal $r'(t)$ to generate a multiplied output signal m(t) on line 46. The integrator 42 receives and integrates the multiplied output signal m(t) to generate an integrated output signal i(t) on line 48 providing an estimate of the phase and gain of any leak-through signal component e'(t) present in the received/leak-through signal r'(t). The multiplication and integration processes performed by the signal canceler 12 comprise a matched filter computation for estimating the gain and phase of the leak-through signal component e'(t). The gain and phase adjustor 44 adjusts the gain and phase of the reference signal $e_r(t)$ received by way of line 52 in accordance with the estimated gain and phase provided by the integrated output signal i(t) to generate the cancellation signal c(t) for output on line 36. Subtraction of the cancellation signal c(t) from the received/leak-through signal r'(t) generates an output signal s(t) on line 21 that is substantially equal to the received signal r(t).

Figure 3:
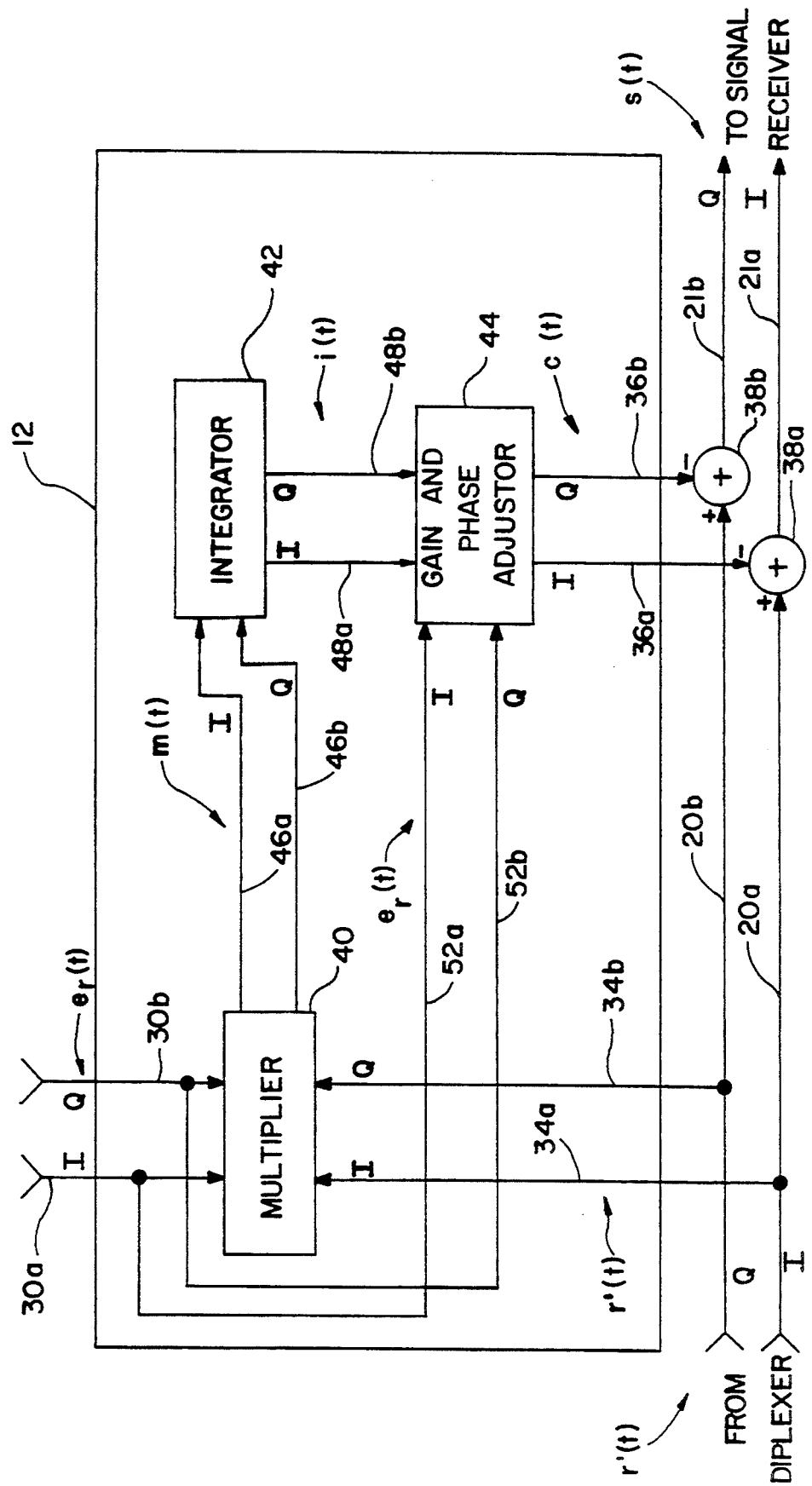
FIG. 3 is a block diagram of the leak-through signal canceler of the present invention shown in FIG. 2 illustrating quadrature phase processing.

Referring now to FIG. 3 there is shown the block diagram of the leak-through signal canceler 12 of the present invention shown in FIG. 2 further illustrating quadrature phase processing of the reference signal $e_r(t)$ and the received/leak-through signal r'(t) to generate the cancellation signal c(t). The reference signal $e_r(t)$ comprises an in-phase component ("I") on line 30a and a quadrature phase component ("Q") on line 30b. The reference signal $e_r(t)$ processed by the gain and phase adjustment circuit comprises an in-phase component on line 52a and a quadrature phase component on line 52b. Similarly, the received/leak-through signal r'(t) comprises an in-phase component on line 34a received from line 20a and a quadrature phase component on line 34b received from line 20b. The multiplied signal output m(t) also includes both an in-phase component on line 46a and a quadrature phase component on line 46b. The integrated output signal i(t) includes both an in-phase component on line 48a and a quadrature phase component on line 48b. Finally, the cancellation signal c(t) includes both an in-phase component on line 36a and a quadrature phase component on line 36b. The in-phase summer 38a subtracts the in-phase component of the cancellation signal on line 36a from the in-phase component of the received/leak-through signal on line 20a to output the in-phase component of the output signal s(t) on line 21a. Similarly, the quadrature phase summer 38b processes the quadrature phase components on lines 36b and 20b to output the quadrature phase component of the output signal s(t) on line 21b.

Figure 4:
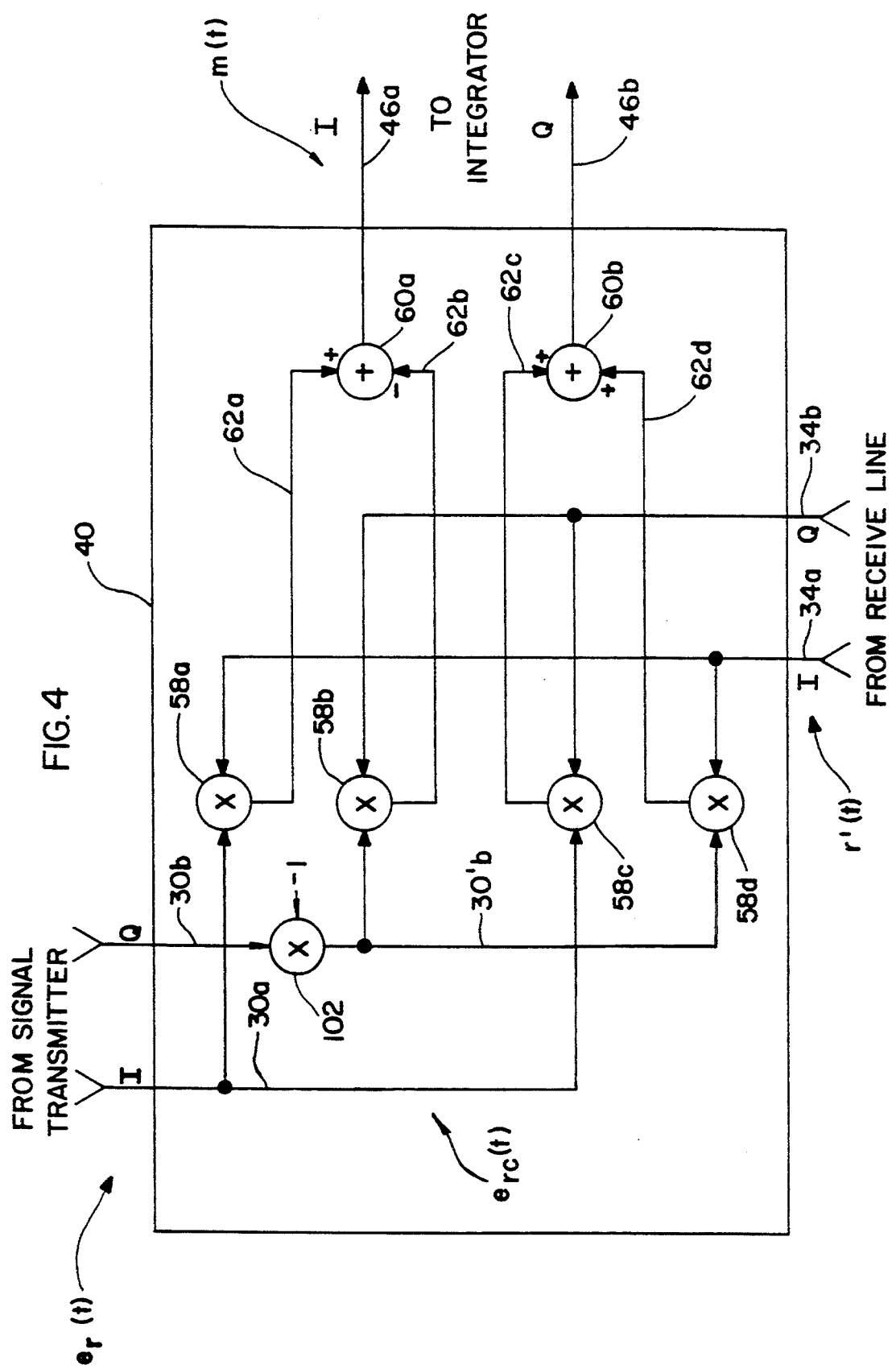
FIG. 4 is a block diagram illustrating one embodiment of a multiplier for the leak-through signal canceler of the present invention.

Referring now to FIG. 4, there is shown a block diagram illustrating one embodiment of the multiplier 40 comprising four signal multipliers 58a–58d and two signal summers 60a–60b for complex multiplication of the reference signal $e_r(t)$ and the received/leak-through signal r'(t). First, however, multiplier 102 generates the complex conjugate $e_{rc}(t)$ of the reference signal $e_r(t)$ by multiplying the imaginary portion of the reference signal on line 30b by "−1". Signal multiplier 58a multiplies the in-phase (or real) components of the complex conjugate reference signal $e_{rc}(t)$ (line 30a) and received/leak-through signal r'(t) (line 34a) to generate a first signal for output on line 62a. Signal multiplier 58b multiplies the quadrature phase (or imaginary) components of the complex conjugate reference signal $e_{rc}(t)$ (line 30'b) and received/leak-through signal r'(t) (line 34b) to generate a second signal for output on line 62b. Summer 60a subtracts the second signal (line 62b) from the first signal (line 62a) to generate the in-phase (or real) component of the multiplied output signal m(t) (line 46a).

Signal multiplier 58c multiplies the in-phase component of the complex conjugate reference signal $e_{rc}(t)$ (line 30a) and the quadrature phase component of the received/leak-through signal r'(t) (line 34b) to generate a third signal for output on line 62c. Signal multiplier 58d multiplies the in-phase component of the received/leak-through signal r'(t) (line 34a) and the quadrature phase component of the complex conjugate reference signal $e_{rc}(t)$ (line 30'b) to generate a fourth signal for output on line 62d. Summer 60b adds the third signal (line 62c) to the fourth signal (line 62d) to generate the quadrature phase (or imaginary) component of the multiplied output signal m(t) (line 46b).

Figure 5:
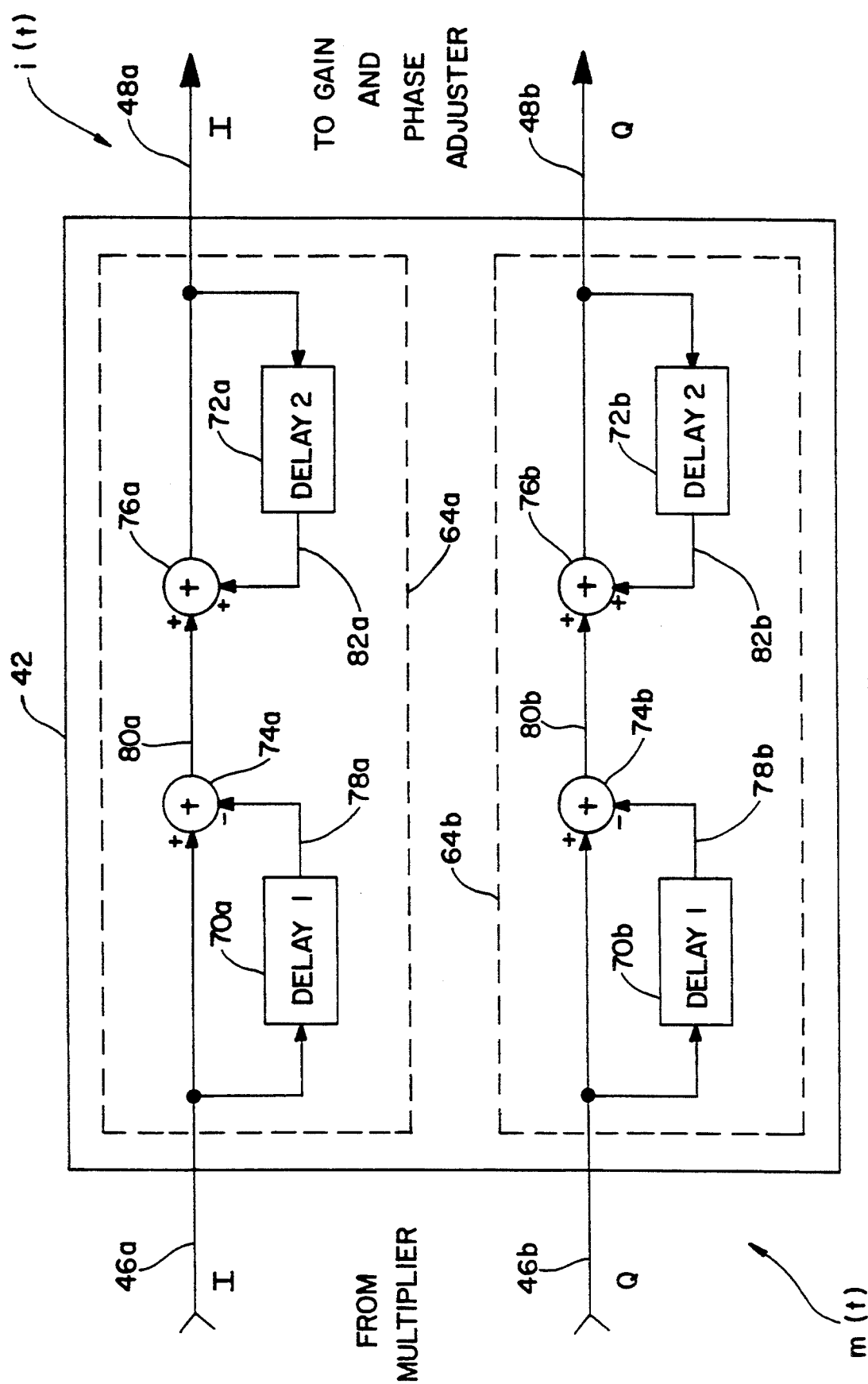
FIG. 5 is a block diagram illustrating one embodiment of an integrator for the leak-through signal canceler of the present invention.

Referring now to FIG. 5, there is shown a block diagram illustrating one embodiment of the integrator 42 comprising an in-phase (or real) component integrator 64a and a quadrature phase (or imaginary) component integrator 64b. The in-phase integrator 64a comprises a pair of delays, 70a and 72a, and a pair of summers, 74a and 76a. The delay 70a delays the in-phase component (line 46a) of the multiplied output signal m(t). The summer 74a subtracts the delayed in-phase component of the multiplied output signal (line 78a) from the in-phase component of the multiplied output signal (line 46a) for output on line 80a. The output (line 82a) of the delay 72a is added by the summer 76a to the output (line 80a) of the summer 74a to generate the in-phase (or real) component of the integrated output signal i(t) for output on line 48a. The delay 72a delays the in-phase component of the integrated output signal i(t) output from the summer 76a (line 48a).

The quadrature phase integrator 64b is configured in an identical manner to the in-phase integrator 64a for output of the quadrature phase (or imaginary) component of the integrated output signal i(t) on line 48b. Therefore, further detailed description of the quadrature phase integrator 64b is deemed unnecessary. It will, however, be noted that the components of the quadrature phase integrator 64b are identified with the postscript "b". The in-phase and quadrature phase components of the integrated output signal i(t) provide an estimate of the in-phase and quadrature phase components of the leak-through signal component e'(t) of the received/leak-through signal r'(t), and thus provide an estimate related to the gain and phase of the leak-through signal component. The complex multiplication and integration processes of the multiplier 40 and integrator 42 perform a matched filter type computation on the reference signal $e_r(t)$ and received/leak-through signal r'(t) to estimate the leak-through signal e'(t) gain and phase.

Figure 6:
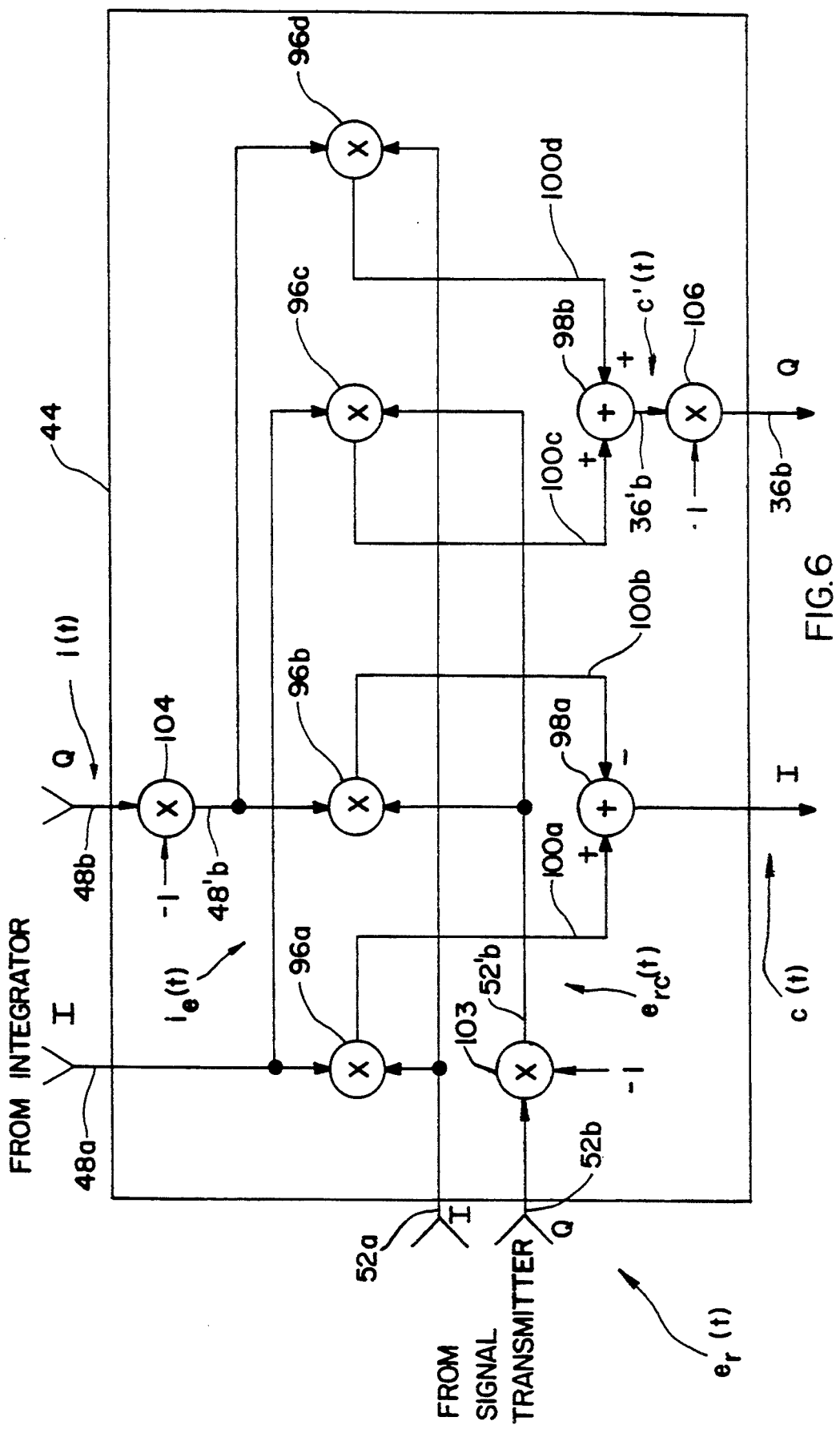
FIG. 6 is a block diagram illustrating one embodiment of a gain and phase adjustor for the leak-through signal canceler of the present invention.

Referring now to FIG. 6, there is shown a block diagram illustrating one complex multiplier embodiment of the gain and phase adjustor 44 comprising four signal multipliers 96a–96d and two signal summers 98a–98b for adjusting the in-phase and quadrature phase components of the reference signal $e_r(t)$ to generate the cancellation signal c(t) that is a substantially gain and phase matched estimate of the leak-through signal e'(t). First, however, multiplier 103 generates the complex conjugate $e_{rc}(t)$ of the reference signal $e_r(t)$ by multiplying the imaginary portion of the reference signal on line 52b by "−1", and multiplier 104 generates the complex conjugate $i_c(t)$ of the integrated output signal i(t) by multiplying the imaginary portion of the integrated output signal on line 48b by "−1". Signal multiplier 96a multiplies the in-phase (or real) components of the complex conjugate reference signal $e_{rc}(t)$ (line 52a) and complex conjugate integrated output signal $i_c(t)$ (line 48a) to generate a first signal for output on line 100a. Signal multiplier 96b multiplies the quadrature phase (or imaginary) components of the complex conjugate reference signal $e_{rc}(t)$ (line 52'b) and complex conjugate integrated output signal $i_c(t)$ (line 48'b) to generate a second signal for output on line 100b. Summer 98a subtracts the second signal (line 100b) from the first signal (line 100a) to generate the in-phase (or real) component of the gain and phase adjust signal $c'(t)$ on line 36a.

Signal multiplier 96c multiplies the in-phase component of the complex conjugate integrated output signal $i_c(t)$ (line 48a) and the quadrature phase component of the complex conjugate reference signal $e_{rc}(t)$ (line 52'b) to generate a third signal for output on line 100c. Signal multiplier 96d multiplies the in-phase component of the complex conjugate reference signal $e_{rc}(t)$ (line 52a) and the quadrature phase component of the complex conjugate integrated output signal $i_c(t)$ (line 48'b) to generate a fourth signal for output on line 100d. Summer 98b adds the third signal (line 100c) to the fourth signal (line 100d) to generate the quadrature phase (or imaginary) component of the gain and phase adjust signal $c'(t)$ on line 36'b. Multiplier 106 generates the correction signal $c(t)$ by multiplying the imaginary portion of the gain and phase adjust signal on line 36b to take the complex conjugate of the gain and phase adjust signal $c't$ output from the summers 98a and 98b.

A more complete understanding of the operation of the leak-through signal canceler of the present invention may be had by reference to the following example. It will, of course, be understood that the following example is by way of illustration and not limitation. In particular, the following example is intended to show the signal processing steps performed by the signal canceler 12 of the present invention, including the steps of: (1) performing matched filter computation by (a) multiplying the reference signal $e_r(t)$ by the received signal $r'(t)$ to generate the multiplied output signal $m(t)$, and (b) integrating the multiplied output signal $m(t)$ to generate the integrated output signal $i(t)$ that includes estimates of the gain and phase of the leak-through signal component $e'(t)$; (2) adjusting the gain and phase of the reference signal $e_r(t)$ according to the estimates of the gain and phase by multiplying the reference signal by the integrated output signal $i(t)$ to generate the cancellation signal $c(t)$ that is a substantially gain and phase matched estimate of the leak-through signal $e'(t)$; and, (3) subtracting the cancellation signal $c(t)$ from the received/leak-through signal $r'(t)$ to recover the received signal $r(t)$ for further processing.

With reference where applicable to FIGS. 1–6, assume that the transmitted signal $e(t)$ output by the signal transmitter 14 for broadcast by antenna 26 is at a frequency f1 and may be written as:

$$e(t) = A * e^{j(w1*t + p1(t))},$$

wherein:
A is the amplitude of the signal;
$w1 = 2\pi f1$; and
$p1(t)$ is the time varying phase waveform of the transmitted signal.

The reference signal $e_r(t)$ provided to the signal canceler 12 is a sample of the transmitted signal $e(t)$ output by the signal transmitter 14 having a complex conjugate $e_{rc}(t)$ that may be written as:

$$e_{rc}(t) = e^{-j(w1*t + p1(t) + p3)},$$

wherein: p3 is the fixed phase offset of the reference signal with respect to the transmitted signal. The complex conjugate $e_{rc}(t)$ is taken by multiplying the quadrature (or imaginary) component of $e_r(t)$ on lines 30b and 52b by "−1" as shown at multipliers 102 and 103 (FIGS. 4 and 6).

Assuming that the leak-through signal $e'(t)$ is a byproduct of the transmitted signal $e(t)$, the leak-through signal will also be at frequency f1 and may be written as:

$$e'(t) = B * e^{j(w1*t + p1(t) + p1)},$$

wherein:
B is the amplitude of the signal; and
p1 is the fixed phase offset of the leak-through signal component with respect to the transmitted signal.

Finally, assume that the received signal $r(t)$ is at frequency f2, that frequencies f1 and f2 are in the passband of the signal receiver 16, and that the received/leak-through signal $r'(t)$ may be written as:

$$\begin{aligned} r'(t) &= r(t) + e'(t) \\ &= C * e^{j(w2*t + p2(t) + p2)} + B * e^{j(w1*t + p1(t) + p1)}, \end{aligned}$$

wherein:
C is the amplitude of the received signal;
$w2 = 2\pi f2$;
$p2(t)$ is the time varying phase waveform of the received signal; and
p2 is the fixed phase offset of the received signal with respect to the transmitted signal.

The complex multiplier 40 multiplies $e_{rc}(t)$ by $r'(t)$ to obtain the multiplied output signal $m(t)$ which may be written as:

$$\begin{aligned} m(t) &= e_{rc}(t) * r'(t) \\ &= g1(t) + g2(t), \end{aligned}$$

wherein:

$$g1(t) = C * e^{j((w2-w1)*t + (p2(t) - p1(t)) + (p2-p3))};$$

and $$g2(t) = B * e^{j(p1-p3)}.$$

The only terms in $m(t)$ of interest that are unknown are the amplitude B of the leak-through signal $e'(t)$ and the fixed phase offset p1 of the leak-through signal $e'(t)$.

The $g1(t)$ term is a complex sine wave at frequency $(w2-w1)$ with a varying phase modulation $(p2(t)-p1(t))$ and a slowly varying phase shift $(p2-p3)$. Processing of the multiplied output signal $m(t)$ by the integrator 42 severely attenuates the $g1(t)$ term through low pass filtering because integration of the $g1(t)$ term is similar to integrating noise. Thus, it may be assumed that the integration of the $g1(t)$ term will make little to no contribution to the integrated output signal $i(t)$.

The $g2(t)$ term is easily integrated because it is a slowly varying function wherein the variance is based on drift in the components of the leak-through signal. The real and imaginary components of the $g2(t)$ term of the multiplied output signal $m(t)$ are integrated and averaged by the integrator 42 to output the integrated output signal $i(t)$ which may be written as:

$$i(t) = Be * e^{j(p1e-p3)},$$

wherein: Be is the estimated amplitude value of B; and p1e is the estimated phase value of p1.

Now that approximate values (Be and p1e) for the unknowns B and p1 of the leak-through signal e'(t) have been estimated, the complex conjugate of the reference signal $e_{rc}(t)$ is multiplied by the complex conjugate $i_c(t)$ of the integrated output signal i(t) in the gain and phase adjustor 44 to generate the gain and phase adjust signal c'(t) as follows:

$$\begin{aligned} c'(t) &= e_{rc}(t) * i_c(t) \\ &= e^{-j(w1*t+p1(t)+p3)} * Be * e^{-j(p1e-p3)} \\ &= Be * e^{-j(w1*t+p1(t)+p1e)}. \end{aligned}$$

The complex conjugate $i_c(t)$ is taken by multiplying the quadrature (or imaginary) component of i(t) on line 48b by "−1" as shown at multiplier 104 (FIG. 6).

The gain and phase adjust signal c'(t) has the same frequency f1 and time varying phase waveform p1(t) as the leak-through signal e'(t). The cancellation signal c(t) is obtained by multiplying the quadrature (or imaginary) component of c'(t) on line 36'b by "−1" as shown at multiplier 106 (FIG. 6) to take the complex conjugate of the gain and phase adjust signal c'(t). The summer 38 subtracts the cancellation signal c(t) from the received/leak-through signal r'(t) generating an output signal s(t) that may be written as follows:

$$s(t) = r'(t) - c(t) = r(t) + e'(t) - c(t) =$$
$$C * e^{j(w2*t+p2(t)+p2)} + B * e^{j(w1*t+p1(t)+p1)} - Be * e^{j(w1*t+p1(t)+p1e)}$$

If Be approximately equals B and p1e approximately equals p1, then c(t) is a substantially gain and phase matched estimate of the leak-through signal e'(t). The summer 38 will then cancel e'(t) by c(t) leaving:

$$s(t) = r(t) = C * e^{j(w2*t+p2(t)+p2)}$$

for processing by the signal receiver 16.

While the cancellation method and apparatus of the present invention has been described in connection with its preferred embodiment, the foregoing description is not intended to limit the scope of the invention to the particular embodiment set forth, but on the contrary, is intended to cover such alternatives, modifications and equivalents as may be included within the spirit and scope of the invention.

I claim:

1. A system for processing a transmitted signal and a received signal to generate an output signal representing an estimate of an undesired signal mixed within the received signal, wherein the undesired signal is a by-product of the transmitted signal, comprising:

means for processing the transmitted and received signals to generate a correction signal, said correction signal comprising estimates of the gain and phase of the undesired signal mixed within the received signal; and means for processing the received signal and the correction signal according to the gain and phase estimates of the correction signal to generate the output signal substantially gain and phase matched to the undesired signal mixed within the received signal.

2. The system as in claim 1 wherein the means for processing the transmitted and the received signals comprises matched filter computational means for generating the correction signal.

3. The system as in claim 2 wherein the means for processing the received signal and the correction signal comprises means for multiplying the transmitted signal by the correction signal to generate the output signal.

4. The system as in claim 1 wherein the means for processing the transmitted and the received signals comprises:

means for multiplying the transmitted signal by the received signal to generate a multiplied output signal; and means for integrating the multiplied output signal to generate the correction signal.

5. The system as in claim 1 further including means for subtracting the output signal from the received signal to substantially cancel the undesired signal from the received signal.

6. A method for processing a transmitted signal and a received signal to generate an output signal representing an estimate of an undesired signal mixed within the received signal, wherein the undesired signal is a by-product of the transmitted signal, comprising the steps of:

matched filter processing of the transmitted and the received signals to generate a correction signal including estimates of the gain and phase of the undesired signal mixed within the received signal; and adjusting the gain and phase of the transmitted signal in accordance with the gain and phase estimates of the correction signal to generate the output signal that is substantially gain and phase matched with the undesired signal mixed within the received signal.

7. The method as in claim 6 wherein the step of matched filter processing comprises the steps of:

multiplying of the transmitted signal by the receiver signal to generate a multiplied signal output; and integrating the multiplied signal output to generate the correction signal including the gain and phase estimates.

8. The method as in claim 7 wherein the step of adjusting comprises the step of:

multiplying the correction signal by the transmitted signal to generate the output signal.

9. The method as in claim 6 further including the step of:

subtracting the output signal from the received signal to substantially cancel the undesired signal from the received signal.

10. A system for cancelling an undesired signal produced on a receiver line by a source of interference, comprising:

means coupled to the source of interference for sampling a reference signal generated by the source of interference;

means coupled to the receiver line for sampling a receiver signal comprised of the undesired signal and a desired signal;

means for processing the reference signal and the receiver signal to generate a correction signal, the correction signal comprising estimates of the gain and phase of the undesired signal within the receiver signal;

means for processing the reference signal and the correction signal to adjust the gain and phase of the reference signal according to the estimates of the gain and phase in the correction signal and generate a cancellation signal substantially gain and phase matched to the undesired signal; and means for subtracting the cancellation signal from the receiver signal to cancel the undesired signal produced on the receiver line.

11. The system as in claim 10 wherein the means for processing the reference signal and the receiver signal comprises matched filter computation means.

12. The system as in claim 11 wherein the matched filter computation means comprises:

means for multiplying the reference signal by the receiver signal to generate a multiplied output signal; and means for integrating the multiplied output signal to generate the estimate signal including the estimates of the gain and phase.

13. The system as in claim 11 wherein the signal adjustor means comprises:

means for multiplying the reference signal by the correction signal comprising estimates of the gain and phase to adjust the gain and phase of the reference signal such that the gain and phase of the generated cancellation signal substantially matches the gain and phase of the undesired signal.

14. The system as in claim 10 wherein the means for processing the reference signal and the correction signal comprises signal adjustor means.

* * * * *